(No Model.)

P. S. RYAN.
MILK COOLER AND AERATOR.

No. 506,942. Patented Oct. 17, 1893.

Attest
Walter Donaldson
F. L. Middleton

Inventor
Patrick S. Ryan
by Ellis Spear
Atty.

UNITED STATES PATENT OFFICE.

PATRICK S. RYAN, OF RUTLAND, VERMONT.

MILK COOLER AND AERATOR.

SPECIFICATION forming part of Letters Patent No. 506,942, dated October 17, 1893.

Application filed May 5, 1893. Serial No. 473,153. (No model.) Patented in Canada April 10, 1893, No. 42,530.

*To all whom it may concern:*

Be it known that I, PATRICK S. RYAN, a citizen of the United States of America, residing at Rutland, in the county of Rutland and State of Vermont, have invented certain new and useful Improvements in Cream and Milk Aerators and Coolers, of which the following is a specification, this invention having been patented to me in the Dominion of Canada, under date of April 10, 1893, No. 42,530.

The object of the invention is to provide a device for cooling cream and milk in which the cream or milk to be cooled is passed over a vessel containing running water, or in very warm weather, over an ice chamber.

The invention is illustrated in the accompanying drawings in which—

Figure 1:
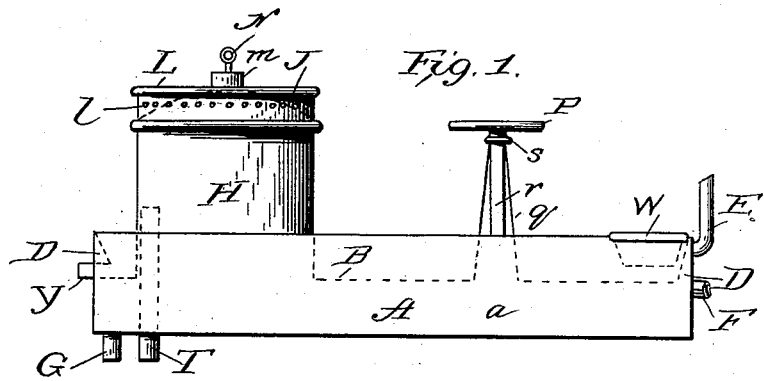
Figure 2:
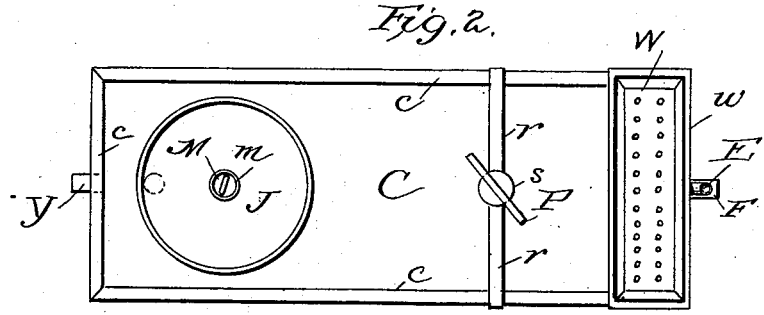
Figure 3:
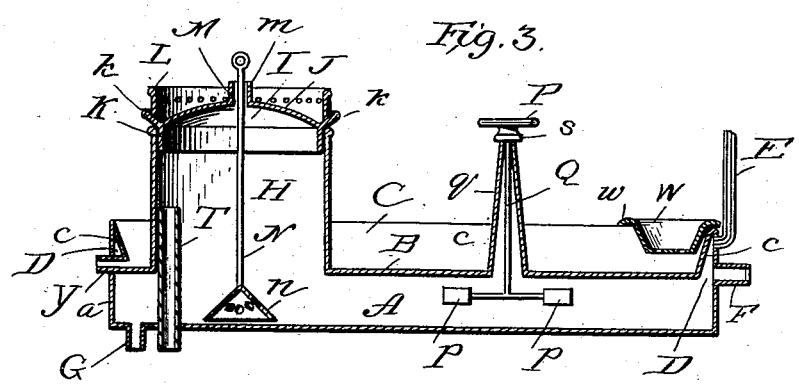

Figure 1 is a side elevation of a cooling device constructed in accordance with my invention. Fig. 2 is a top view of the same, and Fig. 3 is a central vertical section taken longitudinally through the device.

In the figures A is a rectangular shallow tank having a depressed or sunken top B, forming in its upper face a vat or vessel C, open at the top. The sides c, of this vat or vessel C, are inclined or flared and are joined at the top to the sides A of the tank, to form a water tight joint. The flaring sides c, form, with the sides of the tank a water compartment D, which is an upward continuation of the vessel A, and into which the water rises as the vessel is filled, the air from the chamber escaping through the vertical air tube E.

Water is supplied to the tank A, through an inlet F, at one end, and a draw-off cock G, connected with the bottom at the other end provides means for drawing off the water from the tank.

Near the outlet end of the tank a cylindrical vessel H, is secured to the sunken top B, this cylindrical portion being open to the interior of the tank A, at the bottom, and closed at the top by a removable cover I. This cover consists of a hemispherical portion J, having a ring K, around its lower edge adapted to fit closely on the top of the cylinder H, a bead k, preventing it from slipping too far in. Above this bead is a raised perforated ring L, having perforations l, formed around it.

A perforation or opening M, is made in the center of the hemispherical cap J, surrounded by a collar m, and through this perforation is passed a rod N having a hollow perforated cone mounted upon the lower end thereof, forming a plunger.

Between the cylindrical portion H, and the inlet end of the tank is located a fan or agitator, which consists of two or more blades p, rotating within the interior of the tank A. These blades are mounted upon the lower end of the vertical rod Q, which passes up and is journaled in a tube q, secured to the top B, this tube being provided with suitable braces r. The top of this shaft is provided with a collar s, which forms a bearing or supporting surface for supporting the agitator.

Suitable means are provided for turning the shaft carrying the agitator, such for instance as a cross arm P secured to the rod Q above the collar.

In ordinary weather it is designed, when the device is in use, to keep the tank full of running water, and for this purpose the draw off cock is closed and the tank allowed to fill, the overflow being drawn off through an overflow pipe T, which extends up into the cylindrical portion above the level of the top of the water space D. The water thus completely fills the tank A, and the side spaces D, the air escaping as the water rises through the tube E, and by contact of the cold water with the under side of the sunken top the said top is kept cold.

A trough or receptacle W, having a perforated bottom is secured above the inlet end, the over-turned edges w, of the receptacle hooking over the sides c and thereby supporting the receptacle. The cream or milk to be cooled is poured through this trough or receptacle into the vessel C, which, as before stated, is cooled on all sides by the cold water surrounding it, and flows along through said vessel to the delivery end where it is drawn off through a tube Y. While the cream or milk is passing through the vessel C, the agitator may be revolved in the tank beneath, thus keeping the water in rapid motion bringing fresh cool water in contact with the bottom and sides of the said vessel.

In very warm weather, when the milk or cream cannot be sufficiently cooled by the water, the cylinder H is filled with ice, and the cream or milk, instead of being poured through the receptacle W, is poured over the cap J, whence it escapes through the perforations l, in the ring L, and runs down the sides of the cylinder in small streams and is cooled by the ice within the cylinder and aerated by their exposure to the air in this divided or separated condition.

The pounder is used to stir up and pound the ice.

Having thus described my invention, what I claim is—

1. A milk or cream cooling apparatus comprising a closed water chamber, having a depressed top forming a receptacle, an open ended cylindrical extension carried upon said depressed top, and provided with a suitable cover, an inlet to said water chamber, and an overflow having its entrance located within the cylinder above the top of the closed chamber, substantially as described.

2. A milk or cream cooling apparatus comprising a milk vat or receptacle, a water chamber surrounding the sides and bottom thereof, a cylinder mounted upon the bottom of the receptacle communicating with the water chamber, a removable cover for said cylinder having a raised perforated ring, an outlet pipe for the milk receptacle, and inlet and outlet pipes to the water receptacle, substantially as described.

3. In combination with the milk receptacle, the closed water chamber surrounding the bottom and sides of the same, inlet and outlet pipes for the water chamber, a tube extending up from the bottom of the milk receptacle, a vertical shaft journaled in said tube having its lower end depending within the water chamber and carrying a suitable agitating device, and means carried by the shaft above the tube for operating it, substantially as described.

4. In combination with the milk receptacle, the closed water chamber surrounding the sides and bottom thereof, an open ended cylinder located above an opening in the bottom of the receptacle, a removable cover to the cylinder having a perforated raised ring, an ice pounder within said cylinder having its handle extended through an opening in the cover, an outlet pipe from the milk receptacle, and an outlet pipe from the water chamber, substantially as described.

5. In combination with the milk receptacle, the closed water chamber surrounding the sides and bottom thereof, an open ended cylinder located above an opening in the bottom of the receptacle, a removable cover for the cylinder having a perforated raised ring, an inlet to the water chamber, an air outlet from the space between the sides of the receptacle and water chamber, an outlet pipe for the water chamber extending up within the cylinder, and an agitating device located in the water chamber, substantially as described.

In testimony whereof I affix my signature in presence of two witnesses.

PATRICK S. RYAN.

Witnesses:
GUY L. SMITH,
C. H. WEST.